(12) United States Patent
Purushothaman et al.

(10) Patent No.: US 12,139,263 B2
(45) Date of Patent: Nov. 12, 2024

(54) INFLATABLE GIRT FOR EVACUATION SLIDE

(71) Applicant: GOODRICH CORPORATION, Charlotte, NC (US)

(72) Inventors: Srijith Purushothaman, Thrissur (IN); Sudha Damodaran, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 184 days.

(21) Appl. No.: 17/873,675

(22) Filed: Jul. 26, 2022

(65) Prior Publication Data

US 2023/0348077 A1    Nov. 2, 2023

(30) Foreign Application Priority Data

May 2, 2022    (IN) .............................. 202241025541

(51) Int. Cl.
B64D 25/14    (2006.01)

(52) U.S. Cl.
CPC .................................... B64D 25/14 (2013.01)

(58) Field of Classification Search
CPC .. B64D 25/14; B64C 3/30; A62B 1/20; B63B 2027/125
See application file for complete search history.

(56) References Cited

U.S. PATENT DOCUMENTS

| | | | |
|---|---|---|---|
| 2,765,131 A * | 10/1956 | Boyle | B64D 25/14 193/25 B |
| 3,829,353 A * | 8/1974 | Fisher | B64D 25/14 193/25 B |
| 4,846,422 A * | 7/1989 | Fisher | B64D 25/14 193/25 B |
| 5,906,340 A * | 5/1999 | Duggal | B64D 25/14 193/25 B |
| 6,298,970 B1 * | 10/2001 | Targiroff | B64D 25/14 193/25 B |
| 6,698,545 B2 * | 3/2004 | Baker | B64D 25/14 182/48 |
| 7,090,168 B1 | 8/2006 | Brown | |
| 9,399,519 B2 | 7/2016 | Rivault et al. | |
| 10,654,575 B1 * | 5/2020 | Biro | B64D 25/14 |
| 10,926,484 B2 * | 2/2021 | Brensinger | B29C 65/4815 |
| 2009/0049757 A1 * | 2/2009 | Potter | B63B 32/51 441/74 |
| 2011/0278092 A1 * | 11/2011 | Brown | A62B 1/20 182/48 |
| 2014/0224936 A1 * | 8/2014 | Brown | B64D 25/14 182/48 |

(Continued)

OTHER PUBLICATIONS

European Patent Office, European Search Report dated Sep. 27, 2023 in Application No. 23169733.5.

*Primary Examiner* — Benjamin P Lee
(74) *Attorney, Agent, or Firm* — SNELL & WILMER L.L.P.

(57) ABSTRACT

An inflatable girt for an evacuation slide may comprise a sleeve section, an upper section coupled to the sleeve section, and a lower section coupled to at least one of the sleeve second and the upper section. The sleeve section defines a plurality of first inflatable chambers. The upper section defines a plurality of second inflatable chambers. The lower defines a plurality of third inflatable chambers.

14 Claims, 6 Drawing Sheets

(56) References Cited

U.S. PATENT DOCUMENTS

| | | | |
|---|---|---|---|
| 2014/0366341 A1* | 12/2014 | Rivault | B64D 25/14 24/714.7 |
| 2018/0127082 A1 | 5/2018 | Barmichev et al. | |
| 2018/0251224 A1 | 9/2018 | Bahena et al. | |
| 2019/0077515 A1* | 3/2019 | Volny | B64D 25/14 |
| 2020/0391875 A1* | 12/2020 | Haynes | B64D 25/14 |
| 2021/0053693 A1* | 2/2021 | Haynes | B64D 25/14 |

* cited by examiner

INFLATABLE GIRT FOR EVACUATION SLIDE

CROSS-REFERENCE TO RELATED APPLICATIONS

This application claims priority to, and the benefit of, India Provisional Patent Application No. 202241025541, filed May 2, 2022 (DAS Code 58DB) and titled "INFLATABLE GIRT FOR EVACUATION SLIDE," which is incorporated by reference herein in its entirety for all purposes.

FIELD

The present disclosure relates to aircraft evacuation assemblies, and more specifically to an inflatable girt and evacuation slides having inflatable girts.

BACKGROUND

In the event of an emergency landing, aircraft typically have one or more evacuation assemblies, such as inflatable evacuation slides, that can be deployed to facilitate safe evacuation of passengers and crew. Qualification and development testing for aircraft systems, such as evacuation slides, typically includes high wind angle determination. High wind angle is typically defined as the wind angle at which the evacuation slide experiences an increased, and/or its greatest, lateral toe end displacement, head end twisting, and/or toe end gap (i.e., space between the toe end the exit surface). Approximately 70% of tests conducted during qualification and development are wind deployment tests to determine the high wind angle and/or to stabilize the deployment characteristics of the evacuation slide under high wind conditions.

Head end twist and toe end displacement are generally dependent on a stiffness of the joining region of evacuation slide to a girt bar, as the joining region is the location where the hinging/pivoting of the evacuation slide occurs. In this regard, the angle of twist and/or lateral displacement of the evacuation slide, during wind testing, is driven by the stiffness of the joining region. Current joining regions typically include a fabric girt sleeve. The girt sleeve is joined at one end to head end tube(s) of the evacuation slide and is connected (e.g., wrapped around) at the other end to the girt bar, which is coupled to the aircraft fuselage. The girt sleeve exhibits very little resistance to bending or torsion, thereby allowing the girt sleeve to twist and/or buckle in response to twisting and lateral loads applied during the wind testing. Twisting and/or buckling of the girt sleeves allows the evacuation to twist and/or translate laterally, thereby creating high displacements and possible failure of the wind qualification tests.

SUMMARY

An inflatable girt for an evacuation slide is disclosed herein. In accordance with various embodiments, the inflatable girt may comprise a sleeve section defining a plurality of first inflatable chambers, an upper section coupled to the sleeve section and defining a plurality of second inflatable chambers, and a lower section coupled to at least one of the sleeve section and the upper section and defining a plurality of third inflatable chambers.

In various embodiments, the sleeve section includes a first fabric panel forming a first exterior surface and a first interior surface of the sleeve section, a second fabric panel forming a second exterior surface and a second interior surface of the sleeve section, and a plurality of sleeve section seams bonding the first fabric panel to the second fabric panel.

In various embodiments, the upper section includes a first outer fabric panel forming a first upper exterior surface and a first upper interior surface of the upper section, a first inner fabric panel forming a second upper exterior surface and a second upper interior surface of the upper section, and a plurality of upper section seams bonding the first outer fabric panel to the first inner fabric panel.

In various embodiments, the lower section includes a second outer fabric panel forming a first lower exterior surface and a first lower interior surface of the lower section, a second inner fabric panel forming a second lower exterior surface and a second lower interior surface of the lower section, and a plurality of lower section seams bonding the second outer fabric panel to the second inner fabric panel.

In various embodiments, the upper section, the lower section, and the sleeve section meet at a junction. In various embodiments, the plurality of first inflatable chambers is fluidly connected to at least one of the plurality of second inflatable chambers and the plurality of third inflatable chambers. In various embodiments, the first fabric panel is integral to the first outer fabric panel, and the second fabric panel is integral to the second outer fabric panel.

An evacuation slide is also disclosed herein. In accordance with various embodiments, the evacuation slide may comprise a sliding surface, an inflatable rail extending around a perimeter of the sliding surface, and an inflatable girt. The inflatable rail may include a head end tube, a toe end tube longitudinally opposite the head end tube, a first longitudinal tube extending between the head end tube and the toe end tube, and a second longitudinal tube extending between the head end tube and the toe end tube. The inflatable girt may be coupled to the head end tube.

In various embodiments, the inflatable girt is fluidly coupled to the head end tube. In various embodiments, the inflatable girt may comprises a sleeve section defining a plurality of first inflatable chambers, an upper section coupled to the sleeve section and defining a plurality of second inflatable chambers, and a lower section coupled to at least one of the sleeve section and the upper section and defining a plurality of third inflatable chambers.

In various embodiments, the upper section, the lower section and the sleeve section meet at a junction. The upper section extends from the junction to the sliding surface. The lower section extends from the junction to an underside surface opposite the sliding surface. The sleeve section extends from the junction away from the head end tube.

In various embodiments, an end of the sleeve section opposite the junction forms a bar loop. In various embodiments, the plurality of second inflatable chambers is fluidly connected to the head end tube.

In various embodiments, the sleeve section includes a first fabric panel forming a first exterior surface and a first interior surface of the sleeve section, a second fabric panel forming a second exterior surface and a second interior surface of the sleeve section, and a plurality of sleeve section seams bonding the first fabric panel to the second fabric panel.

In various embodiments, the upper section includes a first outer fabric panel forming a first upper exterior surface and a first upper interior surface of the upper section, a first inner fabric panel forming a second upper exterior surface and a second upper interior surface of the upper section, and a plurality of upper section seams bonding the first outer fabric panel to the first inner fabric panel.

In various embodiments, the lower section includes a second outer fabric panel forming a first lower exterior surface and a first lower interior surface of the lower section, a second inner fabric panel forming a second lower exterior surface and a second lower interior surface of the lower section, and a plurality of lower section seams bonding the second outer fabric panel to the second inner fabric panel.

An evacuation assembly is also disclosed herein. In accordance with various embodiments, the evacuation assembly may comprise a compressed fluid source, an evacuation slide in fluidly coupled to the compressed fluid source, and an inflatable girt coupled a head end of the evacuation slide.

In various embodiments, the inflatable girt is fluidly coupled to the evacuation slide. In various embodiments, the inflatable girt comprises a sleeve section defining a plurality of first inflatable chambers, an upper section coupled to the sleeve section and defining a plurality of second inflatable chambers, and a lower section coupled to at least one of the sleeve section and the upper section and defining a plurality of third inflatable chambers. In various embodiments, an end of the sleeve section forms a bar loop.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
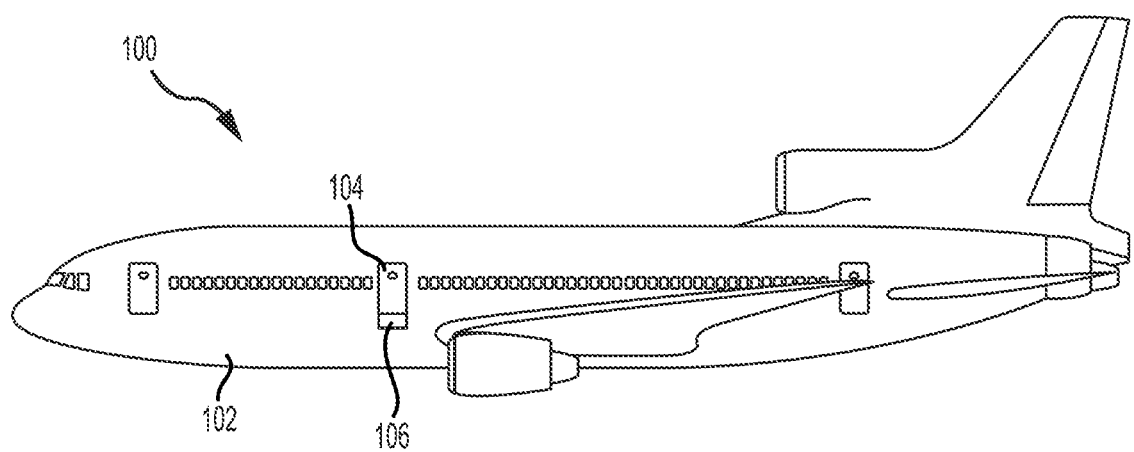
FIG. 1 illustrates a perspective view of an aircraft having an evacuation assembly, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

With reference to FIG. 1, an aircraft 100 is shown. Aircraft 100 includes a fuselage 102 having plurality of exit doors, including an exit door 104. Aircraft 100 includes one or more evacuation systems positioned near a corresponding exit door 104. For example, aircraft 100 includes an evacuation system 106 positioned near exit door 104. In the event of an emergency, exit door 104 may be opened by a passenger or crew member of aircraft 100. Evacuation system 106 may deploy in response to exit door 104 being opened and/or in response to another action taken by a passenger or crew member such as, for example, depression of a button or actuation of a lever. While evacuation system 106 is disclosed as deploying from exit door 104, it is further contemplated and understood that evacuation system 106 may deploy from other locations. For example, evacuation system 106 may deploy from a wing of aircraft 100.

Figure 2:
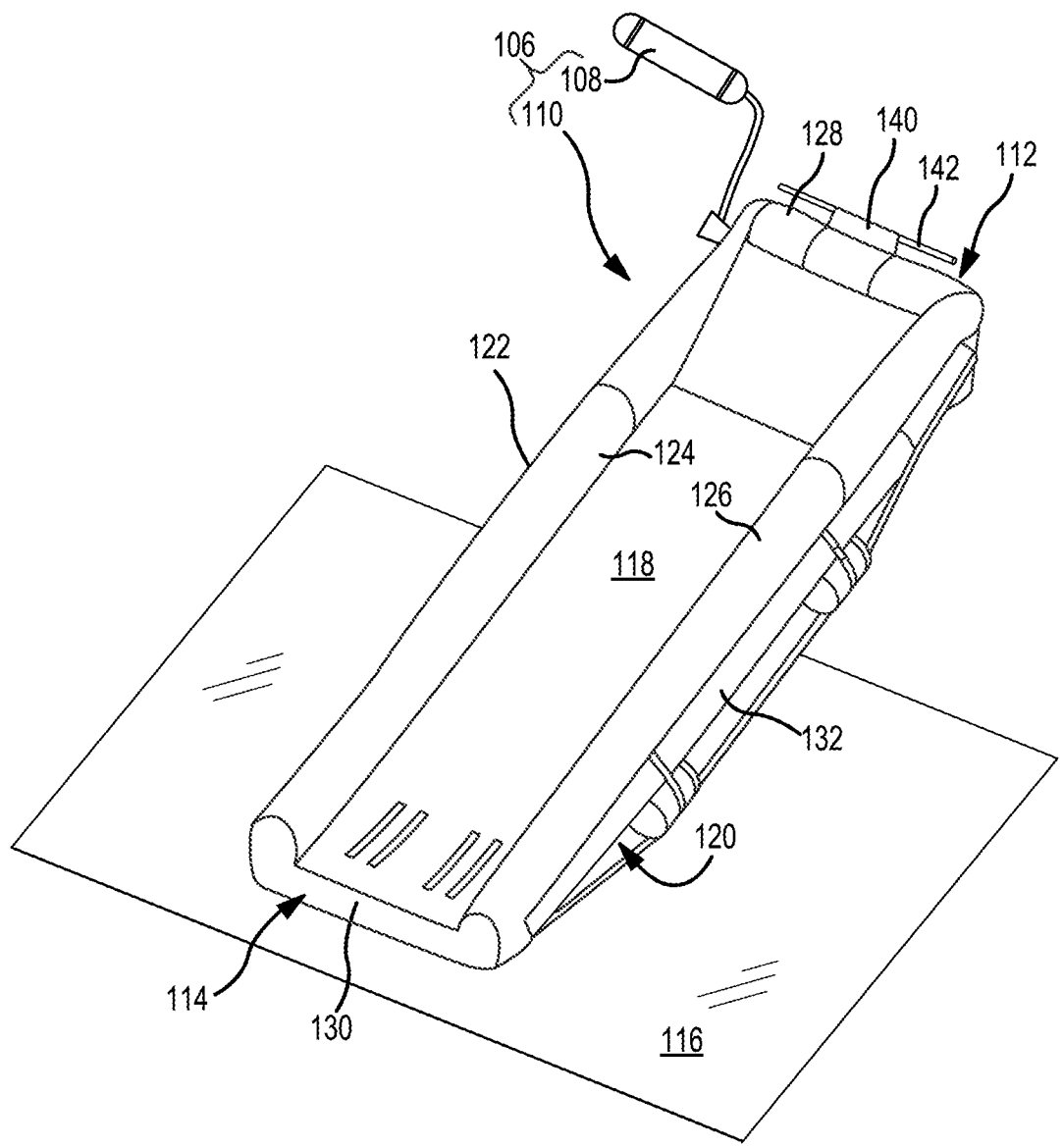
FIG. 2 is a schematic perspective view of an evacuation slide in an inflated state, in accordance with various embodiments.

With reference to FIG. 2, evacuation system 106 is illustrated in a deployed position. In accordance with various embodiments, evacuation system 106 includes an inflatable evacuation slide 110. Evacuation slide 110 may be deployed from an aircraft, such as aircraft 100 in FIG. 1. Evacuation system 106 may further include a compressed fluid source 108. Compressed fluid source 108 is fluidly coupled to evacuation slide 110. Compressed fluid source 108 is configured to provide a pressurized gas to inflate evacuation slide 110.

In accordance with various embodiments, evacuation slide 110 includes a head end 112 and a toe end 114. Toe end 114 is disposed longitudinally opposite the head end 112 such that a longitudinal axis of the evacuation slide 110 extends from the head end 112 to the toe end 114. As used herein, the "lateral" direction refers to directions approximately perpendicular to the longitudinal axis of the evacuation slide 110. As used in the previous context only, "approximately perpendicular" means±10° from perpendicular.

Upon deployment of evacuation slide 110, toe end 114 translates away from the head end 112 and the aircraft 100 (FIG. 1) and contacts an exit surface 116. Exit surface 116 may a ground surface or exit surface 116 may be a water surface in the event of a water landing. Evacuation slide 110 includes a sliding surface 118 and an underside surface 120 opposite sliding surface 118. Sliding surface 118 extends from head end 112 to toe end 114. During an evacuation event, underside surface 120 is oriented generally towards exit surface 116 and sliding surface 118 is oriented generally away from exit surface 116. Evacuation slide 110 includes a first (or upper) rail 122. First rail 122 may extend generally around a perimeter of sliding surface 118. In this regard, first rail 122 may define sliding surface 118. First rail 122 may include a first longitudinal tube 124, a second longitudinal tube 126, a head end tube 128, and a toe end tube 130. Head end tube 128 forms head end 112 of evacuation slide 110. Toe end tube 130 forms toe end 114 of evacuation slide 110. First and second longitudinal tubes 124, 126 may each extend between head end tube 128 and toe end tube 130. In various embodiments, evacuation slide 110 may also include a second (or lower) rail 132. Second rail 132 is located generally between first rail 122 and exit surface 116, upon deployment of evacuation slide 110.

In accordance with various embodiments, evacuation slide 110 includes an inflatable girt 140. Inflatable girt 140 is coupled to head end 112 of evacuation slide 110. Inflatable girt 140 is also coupled to (e.g., wrapped around) a girt bar 142. Girt bar 142 is attached to an aircraft structure (e.g., the fuselage, a door frame, etc.) of aircraft 100, in FIG. 1. In this regard, inflatable girt 140 is coupled to the aircraft structure via girt bar 142. Evacuation slide 110 is coupled to the aircraft structure via its attachment to inflatable girt 140.

Figure 3:
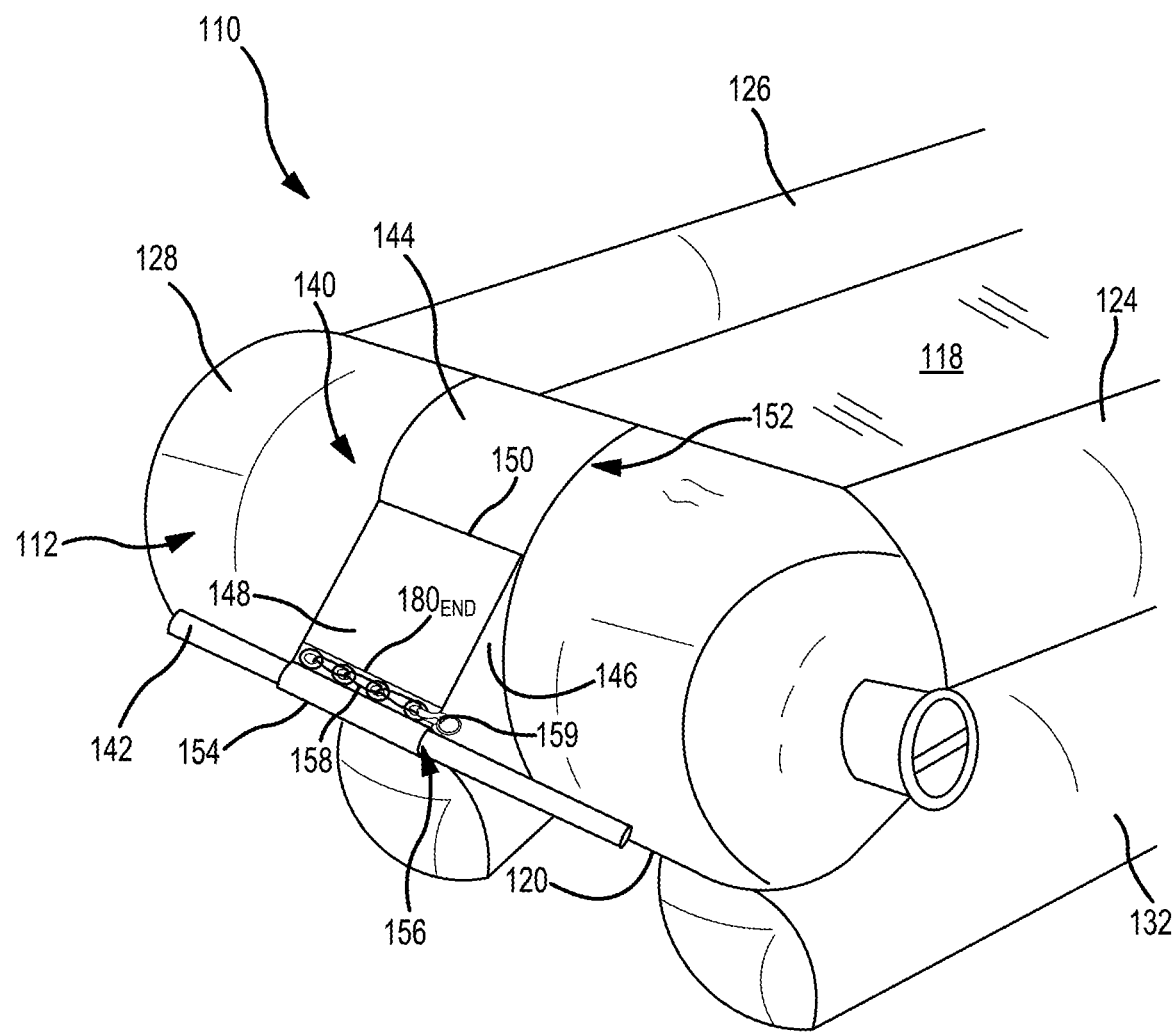
FIG. 3 illustrates an inflatable girt coupled to the head end of an evacuation slide, in accordance with various embodiments.

With reference to FIG. 3, additional details of inflatable girt 140 are illustrated. In accordance with various embodiments, inflatable girt 140 includes an upper section 144, a lower section 146, and a sleeve section 148. Upper section 144, lower section 146 and sleeve section 148 meet one another at a junction, or seam, 150. Upper section 144 extends from junction 150 and/or from lower section 146 and sleeve section 148 to sliding surface 118. Lower section 146 extends from junction 150 and/or from upper section 144 and sleeve section 148 to underside surface 120. Sleeve section 148 extends from junction 150 and/or from upper section 144 and lower section 146 away from head end tube 128. Upper section 144 and lower section 146 may be coupled to head end tube 128. For example, upper section 144 and lower section 146 may be bonded to head end tube 128. In various embodiments, upper section 144 and lower section 146 may form a tube loop 152 through which head end tube 128 is located.

An end 154 of sleeve section 148 forms a bar loop 156 configured to receive girt bar 142. In this regard, inflatable girt 140 and evacuation slide 110 are coupled to the aircraft structure by locating girt bar 142 through bar loop 156. In various embodiments, bar loop 156 is maintained by a lace or cord 158. Cord 158 may be in a daisy chain or speed lacing configuration. In this regard, cord 158 may be configured in a series of loops, with each loop extending through an opening in sleeve section 148 and through an adjacent loop in the series. After a plurality of loops have been threaded together in this manner, a pin, or other securement structure, 159 may close the daisy chain. The cord 158 unlaces in response to removal, or an uncoupling, of the pin 159 from cord 158. In other words, pulling (i.e., removing) the pin 159 from the final loop releases cord 158, thereby opening bar loop 156. The opening of bar loop 156 releases girt bar 142 from sleeve section 148. Stated differently, releasing cord 158 uncouples the inflatable girt 140 and the evacuation slide 110 from the aircraft structure.

As described in further detail below, each of upper section 144, lower section 146 and sleeve section 148 may define a plurality of inflatable chambers. In accordance with various embodiments, the inflatable chambers may be fluidly connected to the head end tube 128. In this regard, inflatable girt 140 is configured to be inflated during inflation of evacuation slide 110. Stated differently, inflatable girt 140 may be inflated via the fluid provided by compressed fluid source 108, in FIG. 2. In the inflated state, the pressure within inflatable girt 140 tends to resist bending and/or twisting loads, and in particular, tends to prevent twisting of head end 112 about the longitudinal axis of evacuation slide 110 and/or lateral displacement of toe end 114 (FIG. 2) during high wind conditions and/or during wind qualification tests. While evacuation slide 110 is illustrated as a single lane slide, it is contemplated and understood that inflatable girt 140 may be employed on any type of evacuation slide. In this regard, inflatable girt 140 may be used with a dual, or multi, lane slide and/or on an over wing slide. For example, an over wing slide may include a slide section and a ramp section extending between the head end of the slide section and the exit door, and inflatable girt 140 may be coupled between the aircraft structure and the end of the ramp section, proximate the exit door.

Figure 4A:
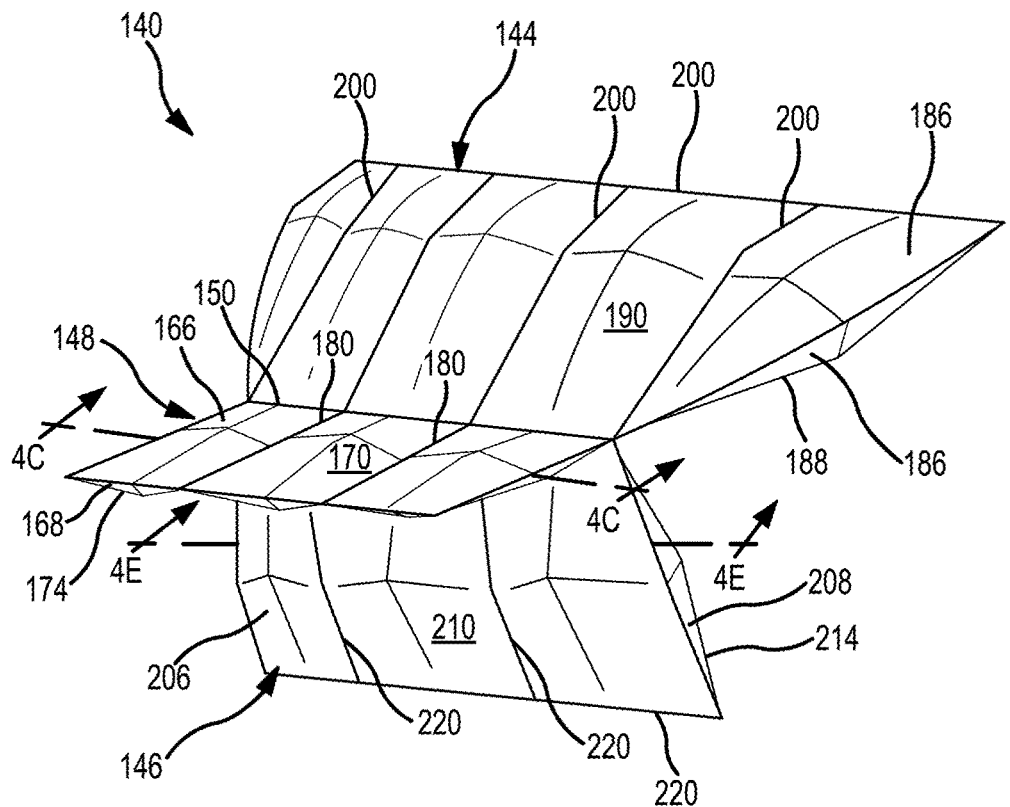
FIG. 4A illustrates an inflatable girt in an inflated state, in accordance with various embodiments.
Figure 4B:
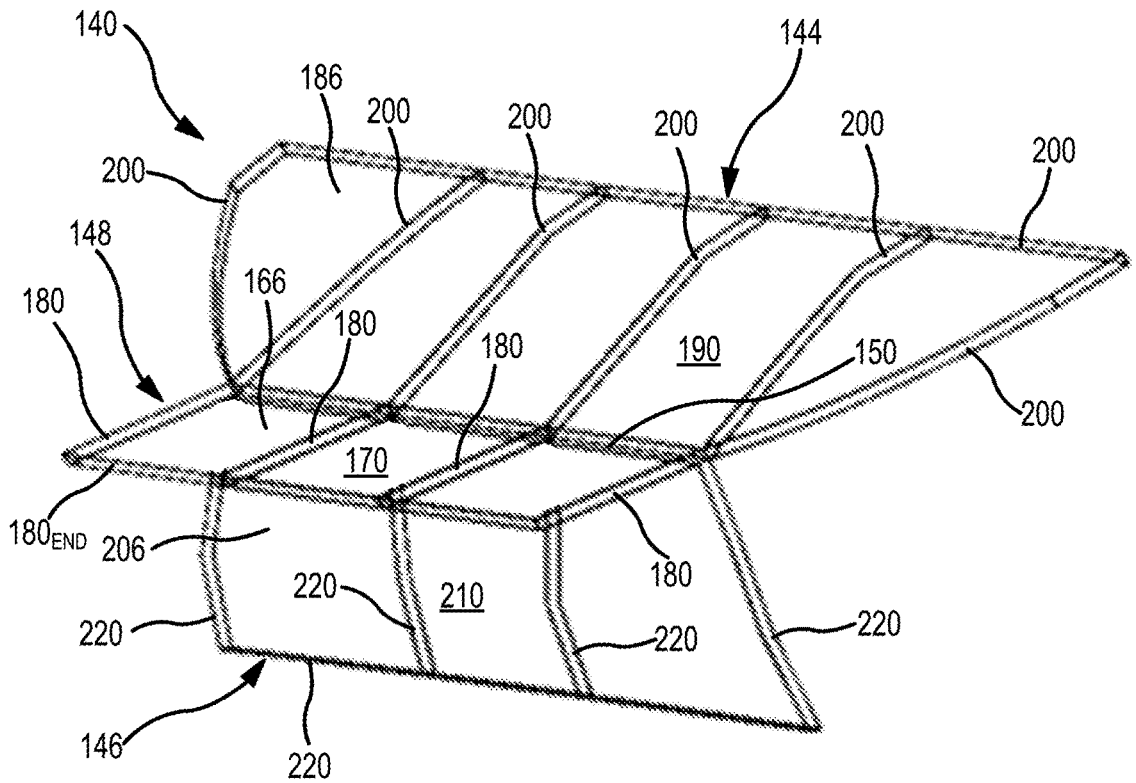
FIG. 4B illustrates an inflatable girt in a deflated state, in accordance with various embodiments.
Figure 4C:
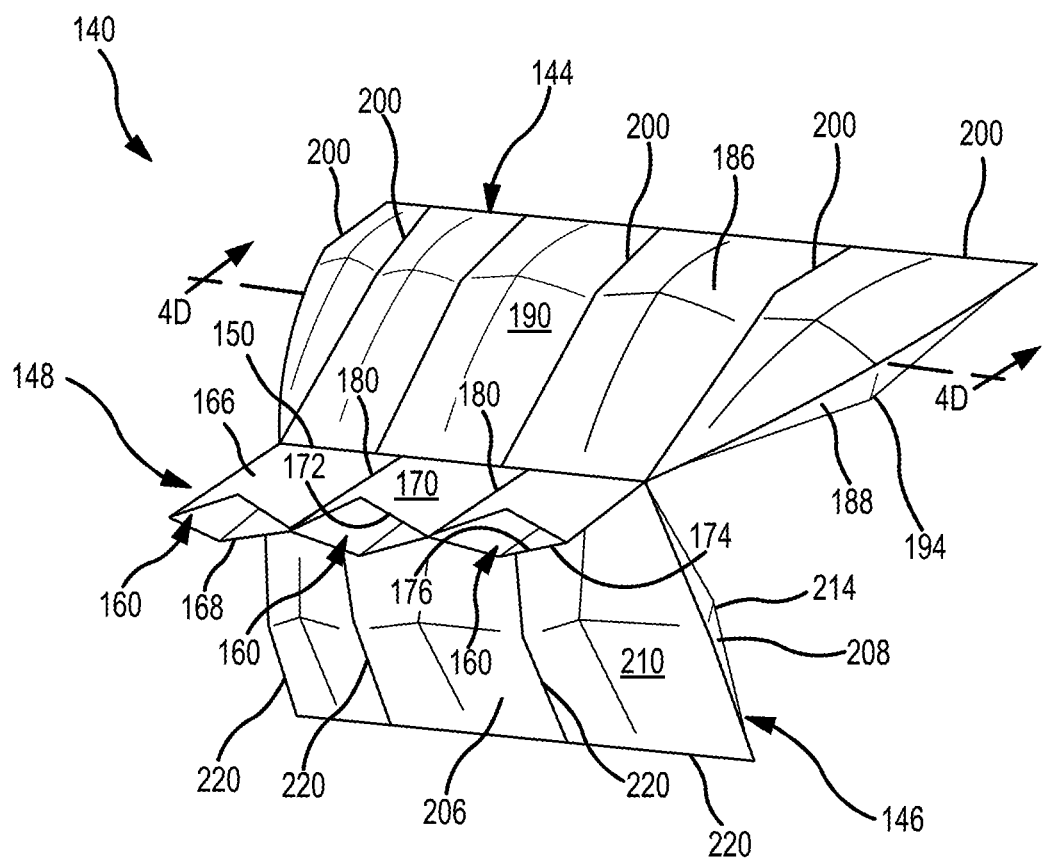
FIG. 4C illustrates a cross-section view, taken along the line 4C-4C in FIG. 4A, of an inflatable girt in the inflated state, in accordance with various embodiments.
Figure 4D:
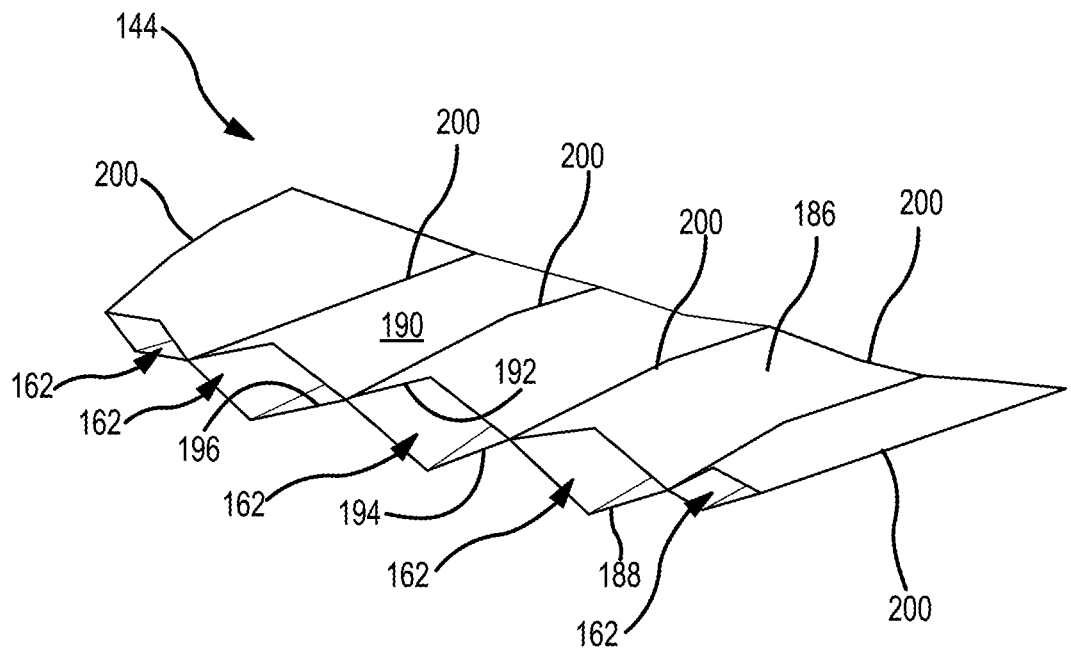
FIG. 4D illustrates a cross-section view, taken along the line 4D-4D in FIG. 4C, of an upper section of an inflatable girt in the inflated state, in accordance with various embodiments.
Figure 4E:
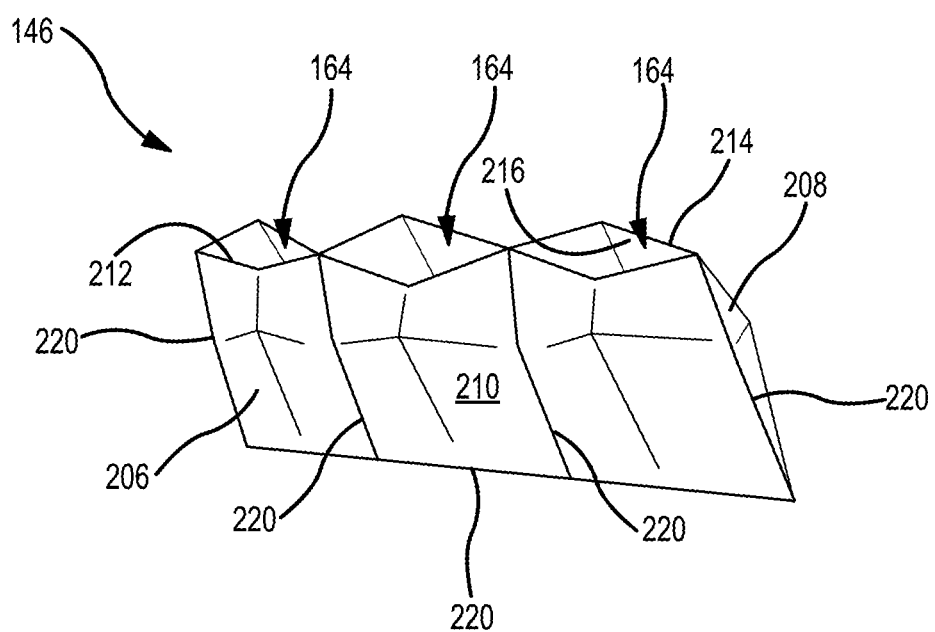
FIG. 4E illustrates a cross-section view, taken along the line 4E-4E in FIG. 4A, of a lower section of an inflatable girt in the inflated state, in accordance with various embodiments.

FIG. 4A illustrates inflatable girt 140 in an inflated state. FIG. 4B illustrates inflatable girt 140 in a deflated state. FIG. 4C illustrates a cross-section view, taken along the line 4C-4C in FIG. 4A, of sleeve section 148 of inflatable girt 140, with inflatable girt 140 in the inflated state. FIG. 4D illustrates a cross-section view, taken along the line 4D-4D in FIG. 4C, of upper section 144 of inflatable girt 140, with inflatable girt 140 in the inflated state. FIG. 4E illustrates a cross-section view, taken along the line 4E-4E in FIG. 4A, of lower section 146 of inflatable girt 140, with inflatable girt 140 in the inflated state. With combined reference to FIG. 4C, FIG. 4D, and FIG. 4E, in accordance with various embodiments, sleeve section 148 defines a plurality of first inflatable chambers 160 (FIG. 4C), upper section 144 defines a plurality of second inflatable chambers 162 (FIG. 4D), and lower section 146 defines a plurality of third inflatable chambers 164 (FIG. 4D).

With particular reference to FIG. 4A, FIG. 4B, and FIG. 4C, first inflatable chambers 160 may be formed by a first fabric panel 166 and a second fabric panel 168. First fabric panel 166 and second fabric panel 168 generally form sleeve section 148. In this regard, first fabric panel 166 forms a first exterior surface 170 and a first interior surface 172 of sleeve section 148, and second fabric panel 168 forms a second exterior surface 174 and a second interior surface 176 of sleeve section 148. First exterior surface 170 is opposite and oriented away from first interior surface 172. Second exterior surface 174 is opposite and oriented away from second interior surface 176. First interior surface 172 is oriented toward second interior surface 176. First interior surface 172 and second interior surface 176 may include an impermeable coating. For example, a polyurethane or other air retentive material may be applied to first interior surface 172 and second interior surface 176. First fabric panel 166 is bonded to second fabric panel 168 at sleeve section seams 180. Sleeve section seams 180 define, at least, a portion of each first inflatable chamber 160. In this regard, sleeve section seams 180 separate adjacent first inflatable chambers 160. Each sleeve section seam 180 may form an airtight seal (e.g., a hermetic barrier) between adjacent first inflatable chambers 160. The bar loop 156 (FIG. 3) and the openings for cord 158 (FIG. 3) may be formed on the opposite side of the sleeve section end seam $180_{END}$ from first inflatable chambers 160. In this regard, first inflatable chambers 160 remain airtight after release of cord 158.

With particular reference to FIG. 4A, FIG. 4B, and FIG. 4D, second inflatable chambers 162 may be formed by a first outer fabric panel 186 and a first inner fabric panel 188. First outer fabric panel 186 and first inner fabric panel 188 generally form upper section 144 of inflatable girt 140. In this regard, first outer fabric panel 186 forms a first upper exterior surface 190 and a first upper interior surface 192 of upper section 144, and first inner fabric panel 188 forms a second upper exterior surface 194 and a second upper interior surface 196 of upper section 144. First upper exterior surface 190 is opposite and oriented away from first upper interior surface 192. Second upper exterior surface 194 is opposite and oriented away from second upper interior surface 196. First upper interior surface 192 is oriented toward second upper interior surface 196. First upper interior surface 192 and second upper interior surface 196 may include an impermeable coating. For example, a polyurethane or other air retentive material may be applied to first upper interior surface 192 and second upper interior surface 196. In various embodiments, first outer fabric panel 186 may be integral with first fabric panel 166. In this regard, first outer fabric panel 186 and first fabric panel 166 may be part a single panel of fabric material. First outer fabric panel 186 is bonded to first inner fabric panel 188 at upper section seams 200. Upper section seams 200 define, at least, a portion of each second inflatable chamber 162. In this regard, upper section seams 200 separate adjacent second inflatable chambers 162. Each upper section seam 200 may form an airtight seal (e.g., a hermetic barrier) between adjacent second inflatable chambers 162.

With particular reference to FIG. 4A, FIG. 4B, and FIG. 4E, third inflatable chambers 164 may be formed by a second outer fabric panel 206 and a second inner fabric panel 208. Second outer fabric panel 206 and second inner fabric panel 208 generally form lower section 146 of inflatable girt 140. In this regard, second outer fabric panel 206 forms a first lower exterior surface 210 and a first lower interior surface 212 of lower section 146, and second inner fabric panel 208 forms a second lower exterior surface 214 and a second lower interior surface 216 of lower section 146. First lower exterior surface 210 is opposite and oriented away from second lower interior surface 216. Second lower exterior surface 214 is opposite and oriented away from second lower interior surface 216. First lower interior surface 212 is oriented toward second lower interior surface 216. First lower interior surface 212 and second lower interior surface 216 may include an impermeable coating. For example, a polyurethane or other air retentive material may be applied to first lower interior surface 212 and second lower interior surface 216. In various embodiments, second outer fabric panel 206 may be integral with second fabric panel 168. In this regard, second outer fabric panel 206 and second fabric panel 168 may be part a single panel of fabric material. In various embodiments, second inner fabric panel 208 may be integral with first inner fabric panel 188. In this regard, second inner fabric panel 208 and first inner fabric panel 188 may be part a single panel of fabric material. Second outer fabric panel 206 is bonded to second inner fabric panel 208 at lower section seams 220. Lower section seams 220 define, at least, a portion of each third inflatable chamber 164. In this regard, lower section seams 220 separate adjacent third inflatable chambers 164. Each lower section seam 220 may form an airtight seal (e.g., a hermetic barrier) between adjacent third inflatable chambers 164.

With reference to FIGS. 4C, 4D, and 4E, in various embodiments, first inflatable chambers 160 are fluidly connected to second inflatable chambers 162 and/or to third inflatable chambers 164. In this regard, one or more fluid paths may be formed between first inflatable chambers 160 and at least one second inflatable chamber 162 and/or between first inflatable chambers 160 and at least one third inflatable chamber 164. In various embodiments, the flow path(s) may be formed at junction 150. With additional reference to FIG. 3, second inflatable chambers 162 are fluidly coupled to head end tube 128 such that fluid flows from head end tube 128 into second inflatable chambers 162. In various embodiments, third inflatable chambers 164 are also fluidly coupled to head end tube 128 such that fluid flows from head end tube 128 into third inflatable chambers 164. In various embodiments, third inflatable chambers 164 may be fluidly coupled to head end tube 128 via second inflatable chambers 162 and/or via first inflatable chambers 160. In this regard, in response to deployment of evacuation slide 110, fluid from compressed fluid source 108 (FIG. 2) flows into head end tube 128 and from head end tube 128 into second inflatable chambers 162 and then from second inflatable chambers 162 into first inflatable chambers 160 and third inflatable chambers 164. The various fluid paths between first inflatable chambers 160, second inflatable chambers 162, and third inflatable chambers 164 may be formed at junction 150. In this regard, the bonding between the interior surfaces of the various fabric panels may be non-continuous along junction 150. The locations along junction 150 where the fabric panels are not bonded together define orifices through which fluid may flow to inflate the first, second, and third inflatable chambers 160, 162, 164. Stated differently, first, second, and third inflatable chambers 160, 162, 164 may be in fluid communication. For example, in various embodiments, first, second, and third inflatable chambers 160, 162, 164 may be part of one, interconnected fluid path, which is fluidly connected to head end tube 128. The fluid connection to head end tube 128 causes first, second, and third inflatable chambers 160, 162, 164 to inflate in response to deployment of evacuation slide 110. While first, second, and third inflatable chambers 160, 162, 164 are illustrated as extending in a generally longitudinal direction, it is contemplated and understood that one or more of first, second, and third inflatable chambers 160, 162, 164 may extend in a generally lateral direction. In this regard, inflatable girt 140 may be formed with one or more of first, second, and third inflatable chambers 160, 162, 164 oriented 90° from the position shown in any of FIGS. 4A, 4B, 4C, 4D, and 4E.

The pressure within first, second, and third inflatable chambers 160, 162, 164 is configured to resist buckling, bending, and/or twisting of inflatable girt 140. In this regard, inflatable girt 140 tends to make evacuation slide 110, with momentary additional reference to FIG. 2, less susceptible to lateral displacement of toe end 114, to twisting of head end 112 about the longitudinal axis of evacuation slide 110, and/or to separation of toe end 114 from exit surface 116 (i.e., toe gap). The pressurized inflatable girt 140 acts as a beam section with increased moment of inertia and torsional stiffness to reduce the bending and twist. For example, simulations have shown then when subjected to the same wind load, a slide having a standard, non-inflatable girt exhibited a 9° head end twist and a lateral toe end deflection of 33.0 inches (83.8 cm), while the same evacuation slide with an inflatable girt, as disclosed herein, coupled thereto experienced a 3° head end twist and a toe end deflection of 23.0 inches (58.4 cm).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inflatable girt for an evacuation slide, the inflatable girt comprising:
    a bar loop configured to receive a girt bar;
    a sleeve section defining a plurality of first inflatable chambers;
    an upper section coupled to the sleeve section and defining a plurality of second inflatable chambers; and
    a lower section coupled to at least one of the sleeve section and the upper section and defining a plurality of third inflatable chambers, wherein:
        the upper section, the lower section and the sleeve section meet at a junction,
        the upper section extends from the junction to a sliding surface of the evacuation slide,
        the lower section extends from the junction to an underside surface opposite the sliding surface of the evacuation slide, and
        the sleeve section extends from the bar loop to the junction.

2. The inflatable girt of claim 1, wherein the sleeve section includes:
    a first fabric panel forming a first exterior surface and a first interior surface of the sleeve section;
    a second fabric panel forming a second exterior surface and a second interior surface of the sleeve section; and
    a plurality of sleeve section seams bonding the first fabric panel to the second fabric panel.

3. The inflatable girt of claim 2, wherein the upper section includes:
    a first outer fabric panel forming a first upper exterior surface and a first upper interior surface of the upper section;
    a first inner fabric panel forming a second upper exterior surface and a second upper interior surface of the upper section; and
    a plurality of upper section seams bonding the first outer fabric panel to the first inner fabric panel.

4. The inflatable girt of claim 3, wherein the lower section includes:
    a second outer fabric panel forming a first lower exterior surface and a first lower interior surface of the lower section;
    a second inner fabric panel forming a second lower exterior surface and a second lower interior surface of the lower section; and
    a plurality of lower section seams bonding the second outer fabric panel to the second inner fabric panel.

5. The inflatable girt of claim 4, wherein the plurality of first inflatable chambers is fluidly connected to at least one of the plurality of second inflatable chambers and the plurality of third inflatable chambers.

6. The inflatable girt of claim 4, wherein the first fabric panel is integral to the first outer fabric panel, and wherein the second fabric panel is integral to the second outer fabric panel.

7. An evacuation slide, comprising:
    a sliding surface;
    an inflatable rail extending around a perimeter of the sliding surface, the inflatable rail including a head end tube, a toe end tube longitudinally opposite the head end tube, a first longitudinal tube extending between the head end tube and the toe end tube, and a second longitudinal tube extending between the head end tube and the toe end tube; and
    an inflatable girt coupled to the head end tube, the inflatable girt fluidly coupled to the head end tube, the inflatable girt comprising:
        a bar loop configured to receive a girt bar;
        a sleeve section defining a plurality of first inflatable chambers;
        an upper section coupled to the sleeve section and defining a plurality of second inflatable chambers; and
        a lower section coupled to at least one of the sleeve section and the upper section and defining a plurality of third inflatable chambers, wherein:

the upper section, the lower section and the sleeve section meet at a junction, the upper section extends from the junction to the sliding surface, the lower section extends from the junction to an underside surface opposite the sliding surface, and the sleeve section extends from the junction away from the head end tube to the bar loop.

8. The evacuation slide of claim 7, wherein an end of the sleeve section opposite the junction forms the bar loop.

9. The evacuation slide of claim 7, wherein the plurality of second inflatable chambers is fluidly connected to the head end tube.

10. The evacuation slide of claim 9, wherein the sleeve section includes:
   a first fabric panel forming a first exterior surface and a first interior surface of the sleeve section;
   a second fabric panel forming a second exterior surface and a second interior surface of the sleeve section; and
   a plurality of sleeve section seams bonding the first fabric panel to the second fabric panel.

11. The evacuation slide of claim 10, wherein the upper section includes:
   a first outer fabric panel forming a first upper exterior surface and a first upper interior surface of the upper section;
   a first inner fabric panel forming a second upper exterior surface and a second upper interior surface of the upper section; and
   a plurality of upper section seams bonding the first outer fabric panel to the first inner fabric panel.

12. The evacuation slide of claim 11, wherein the lower section includes:
   a second outer fabric panel forming a first lower exterior surface and a first lower interior surface of the lower section;
   a second inner fabric panel forming a second lower exterior surface and a second lower interior surface of the lower section; and
   a plurality of lower section seams bonding the second outer fabric panel to the second inner fabric panel.

13. An evacuation assembly, comprising:
   a girt bar;
   a compressed fluid source;
   an evacuation slide fluidly coupled to the compressed fluid source, the evacuation slide comprising a sliding surface and an underside surface, the underside surface disposed opposite the sliding surface; and
   an inflatable girt coupled a head end of the evacuation slide, the inflatable girt comprising:
      a bar loop configured to receive the girt bar,
      a sleeve section defining a plurality of first inflatable chambers;
      an upper section coupled to the sleeve section and defining a plurality of second inflatable chambers; and
      a lower section coupled to at least one of the sleeve section and the upper section and defining a plurality of third inflatable chambers, wherein:
         the sleeve section extends from the bar loop to a junction,
         the upper section extends from the junction to the sliding surface, and
         the lower section extends from the junction to the underside surface.

14. The evacuation assembly of claim 13, wherein the inflatable girt is fluidly coupled to the evacuation slide.

* * * * *